United States Patent
Fisher et al.

(10) Patent No.: US 10,136,201 B2
(45) Date of Patent: Nov. 20, 2018

(54) SPEAKER SYSTEM CHARGING STATION

(71) Applicant: Harman International Industries, Inc., Stamford, CT (US)

(72) Inventors: Mark Fisher, Sherman Oaks, CA (US); An Duc Nguyen, West Hills, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/336,067

(22) Filed: Oct. 27, 2016

(65) Prior Publication Data

US 2017/0127204 A1  May 4, 2017

Related U.S. Application Data

(60) Provisional application No. 62/247,529, filed on Oct. 28, 2015.

(51) Int. Cl.
| | |
|---|---|
| *H04R 1/02* | (2006.01) |
| *H02J 7/00* | (2006.01) |
| *H04R 29/00* | (2006.01) |
| *H04R 3/14* | (2006.01) |
| *H04R 5/02* | (2006.01) |

(52) U.S. Cl.
CPC ............. *H04R 1/02* (2013.01); *H02J 7/0044* (2013.01); *H04R 3/14* (2013.01); *H04R 5/02* (2013.01); *H04R 2205/024* (2013.01); *H04R 2420/01* (2013.01); *H04R 2420/07* (2013.01)

(58) Field of Classification Search
CPC .......... H04R 29/001; H04R 1/02; H04R 3/12; H04R 2420/01; H04R 2420/07

USPC .......................................... 381/58–59, 77, 79
See application file for complete search history.

(56) References Cited

U.S. PATENT DOCUMENTS

| | | | |
|---|---|---|---|
| 8,638,957 B2 | 1/2014 | Sim et al. | |
| 2011/0069844 A1* | 3/2011 | Krampf | H03J 1/0025 381/58 |
| 2013/0279706 A1* | 10/2013 | Marti | G06F 3/165 381/57 |
| 2014/0140537 A1* | 5/2014 | Soulodre | H03G 5/005 381/104 |
| 2014/0341404 A1 | 11/2014 | Choisel et al. | |
| 2015/0002088 A1 | 1/2015 | D'Agostino | |
| 2016/0014513 A1* | 1/2016 | McCoy | H04R 3/12 381/79 |

OTHER PUBLICATIONS

JBL by Harman, "Voyager Integrated Home Audio System with Portable Wireless Speaker," Harman International Industries, Inc. (2013).

* cited by examiner

*Primary Examiner* — Disler Paul
(74) *Attorney, Agent, or Firm* — Brooks Kushman P.C.

(57) ABSTRACT

A speaker assembly is provided with a housing, at least one transducer supported by the housing, and a controller. The controller is adapted to receive a first audio signal from a first audio source and a second audio signal from a second audio source. The controller is programmed to prioritize the first audio signal and the second audio signal based on a location of the housing relative to a charging station, and to provide the highest priority audio signal to the at least one transducer.

17 Claims, 4 Drawing Sheets

SPEAKER SYSTEM CHARGING STATION

CROSS-REFERENCE TO RELATED APPLICATIONS

This application claims the benefit of U.S. provisional application Ser. No. 62/247,529 filed Oct. 28, 2015, the disclosure of which is hereby incorporated in its entirety by reference herein.

TECHNICAL FIELD

One or more embodiments relate to a charging station and a speaker system that is operable with a home audio system and also operable independent of the vehicle audio system as a portable speaker.

BACKGROUND

Portable speaker systems that are operable with multiple audio systems are known. For example, the Voyager by JBL® is an integrated home audio system with a portable wireless speaker that is detachable from a dock and communicates with other media devices as a portable speaker.

Home audio systems typically include speaker assemblies with electrical wires that connect to an electrical outlet, leaving the wires exposed within the room.

SUMMARY

In one embodiment, a speaker assembly is provided with a housing, at least one transducer supported by the housing, and a controller. The controller is adapted to receive a first audio signal from a first audio source and a second audio signal from a second audio source. The controller is programmed to prioritize the first audio signal and the second audio signal based on a location of the housing relative to a charging station, and to provide the highest priority audio signal to the at least one transducer.

In another embodiment, a speaker system is provided with a housing, at least one transducer supported by the housing, and a controller. The controller is configured to receive a first audio signal from a first audio source and a second audio signal from a second audio source and to determine a location of the housing relative to a charging station. The controller is further configured to prioritize the first audio signal and the second audio signal based on a location of the housing relative to the charging station, and provide the highest priority audio signal to the at least one transducer.

In yet another embodiment a method is provided for controlling a speaker system. A first audio signal is received from a first audio source. A second audio signal is received from a second audio source. The first audio signal and the second audio signal are prioritized based on a location of a speaker system relative to a charging station. At least one transducer of the speaker system is controlled to play sound corresponding to the highest priority audio signal.

In one embodiment a charging station is provided with a base including a first surface for mounting to an upright surface and a second surface extending transversely from the first surface with a recess formed therein. The charging station also includes an electrical connector supported within the recess and a wire extending from the electrical connector, through the first surface and adapted to extend through the upright surface for connecting to a power supply. The recess is sized for receiving a lower end of an housing of the speaker system, and wherein the lower end of the housing includes a speaker connector for connecting to the electrical connector for facilitating charging of a speaker battery.

In another embodiment, a speaker system is provided with at least one transducer and a controller. The controller is configured to receive a first audio signal from a home entertainment system and a second audio signal from a portable media device and to determine the location of the speaker system relative to a charging station. The controller is further configured to provide the first audio signal to the at least one transducer in response to the speaker system being docked to the charging station; and to provide the second audio signal to the at least one transducer in response to the speaker system not being docked to the charging station.

As such the charging station conceals its electrical wire by routing it through the wall it is mounted to, which provides a more aesthetic alternative to known charging stations. Further, the speaker system prioritizes incoming audio signals based on whether or not the speaker system is docked, which is indicative of the user's intent for the speaker—i.e., to operate as part of a home entertainment system or as a portable speaker system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
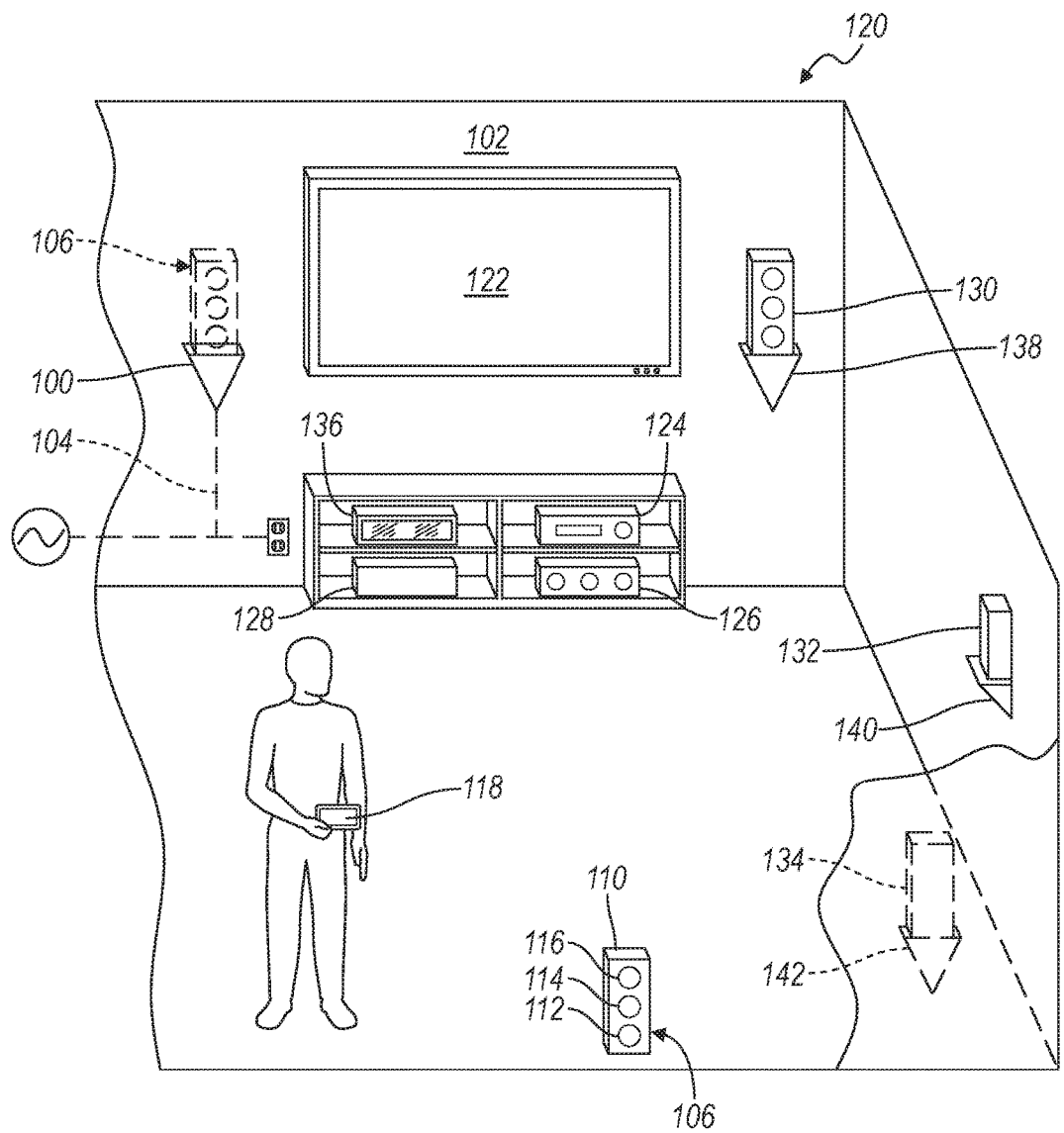
FIG. 1 is a front perspective view of a home audio system including speaker systems docked with charging stations according to one or more embodiments, and also illustrating a speaker system located remote from its charging station.

With reference to FIG. 1, a charging station is illustrated in accordance with one or more embodiments and generally illustrated by numeral 100. The charging station 100 is mounted to a wall 102 of a building, e.g., a house. The charging station 100 is connected to the home AC power by a wire 104 that is routed through the wall 102 and along an inner surface of the wall 102. The wire 104 is concealed and not visible to the user. The charging station 100 supports a speaker system 106. The charging station 100 and the speaker system 106 are collectively referred to as a speaker assembly. The charging station 100 also provides electrical energy to the speaker system 106 for operation and for charging a speaker battery 108 (shown in FIG. 3).

The speaker system 106 may also be removed from the charging station 100 and function as a portable speaker system, as depicted in the lower portion of FIG. 1. The speaker system 106 includes an housing 110 that supports at least three transducers or drivers: a low-frequency transducer 112 (e.g., a woofer), a mid-range transducer 114 and a high-frequency transducer 116 (e.g., a tweeter). When removed from the charging station 100, the speaker system 106 communicates wirelessly with a portable media device (e.g., a cellphone or tablet) 118 for receiving audio signals. Other embodiments of the speaker system 106 include one or two transducers that accommodate the full frequency range (not shown).

The charging station 100 and speaker system 106 are part of a home entertainment system 120. The home entertainment system 120 includes an assortment of audio, visual and peripheral devices. For example, the home entertainment system 120 includes a television 122, a media player 124 (e.g., a DVD player), an audio receiver 126 (e.g., AM, FM, Satellite Radio) and a router 128 according to the illustrated embodiment. The home entertainment system 120 also includes a plurality of speakers to provide sound from a 360° radius in the horizontal plane (i.e., "surround" sound). These speakers include a front-right speaker 130, a right-side speaker 132, a rear-right speaker 134, a rear-left speaker (not shown), a left-side speaker (not shown), a front-left speaker (speaker system 106) and a subwoofer 136. The speakers may be portable wireless speakers, like the speaker system 106, or conventional fixed wired speakers. The illustrated embodiment depicts the front right speaker 130, the right-side speaker 132 and the rear-right speaker 134 as portable wireless speaker systems that are supported by charging stations 138, 140 and 142 respectively. The home entertainment system 120 also includes a home controller 144 (shown in FIG. 3) for controlling various aspects of the devices included in the home entertainment system 120. In other embodiments, the home controller 144 is incorporated into one of the devices (e.g., the television 122). The speaker system 106 also includes a speaker controller 146 for controlling its operation.

Figure 2:
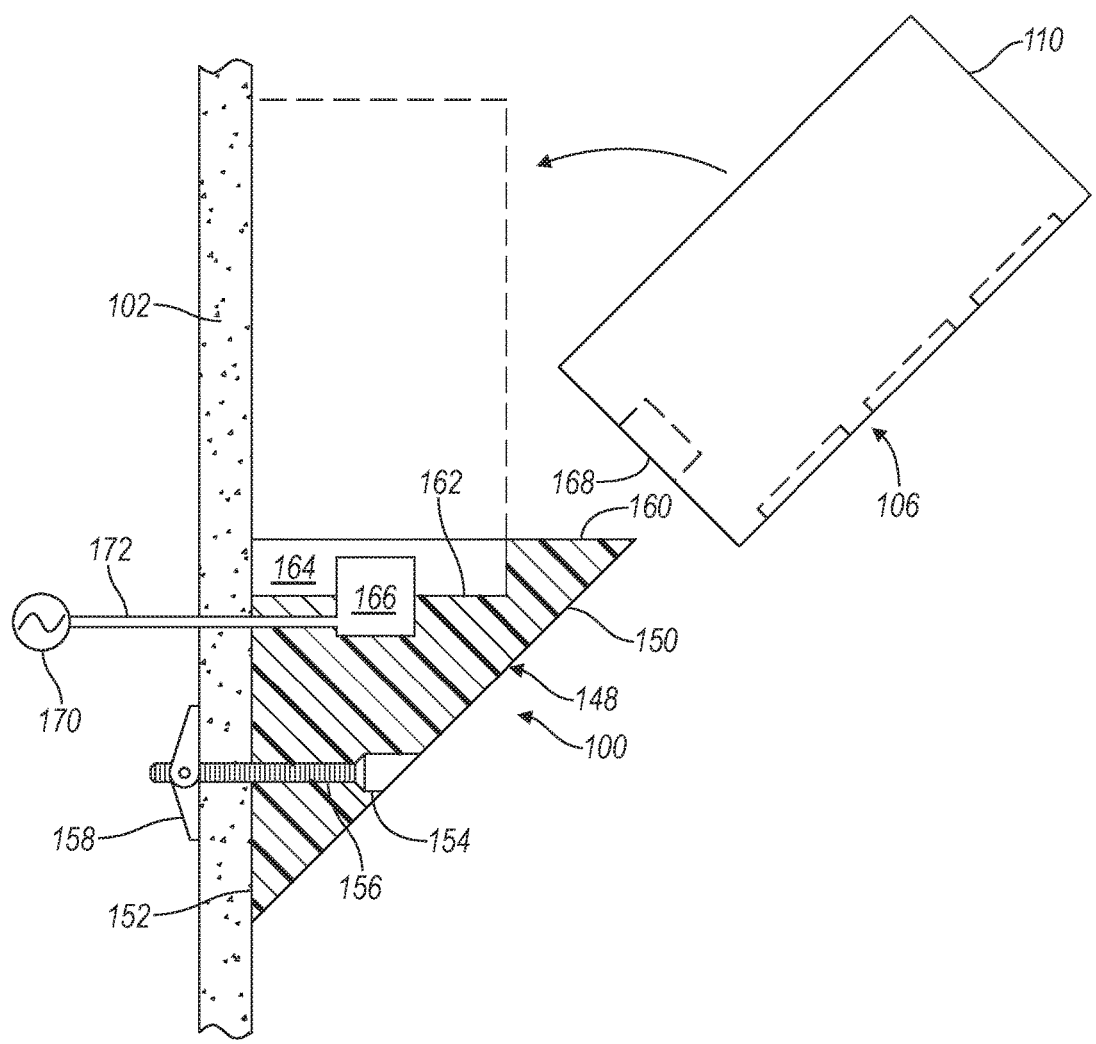
FIG. 2 is a vertical section view of one of the charging stations of FIG. 1, illustrating the docking of a speaker system to the charging system.

Referring to FIG. 2, the charging station 100 includes a base 148 that is formed in a generally semi-conical shape, according to the illustrated embodiment. The base 148 includes a front-surface 150 and a rear-surface 152. An aperture 154 extends through the base 148 between the front-surface 150 and the rear-surface 152. The rear-surface 152 is mounted to the wall 102 by a fastener 156 that extends through the aperture 154. The wall 102 of the illustrated embodiment is formed of a panel made of gypsum plaster (i.e., "drywall"), and therefore the fastener 156 includes an anchor 158 for securing the base 148 to the wall 102.

The charging station 100 supports the speaker system 106. The base 148 includes an upper-surface 160 with a recess 162 formed therein. The recess 162 defines a cavity 164 that is sized for receiving a lower-portion of the housing 110 of the speaker system 106.

Figure 3:
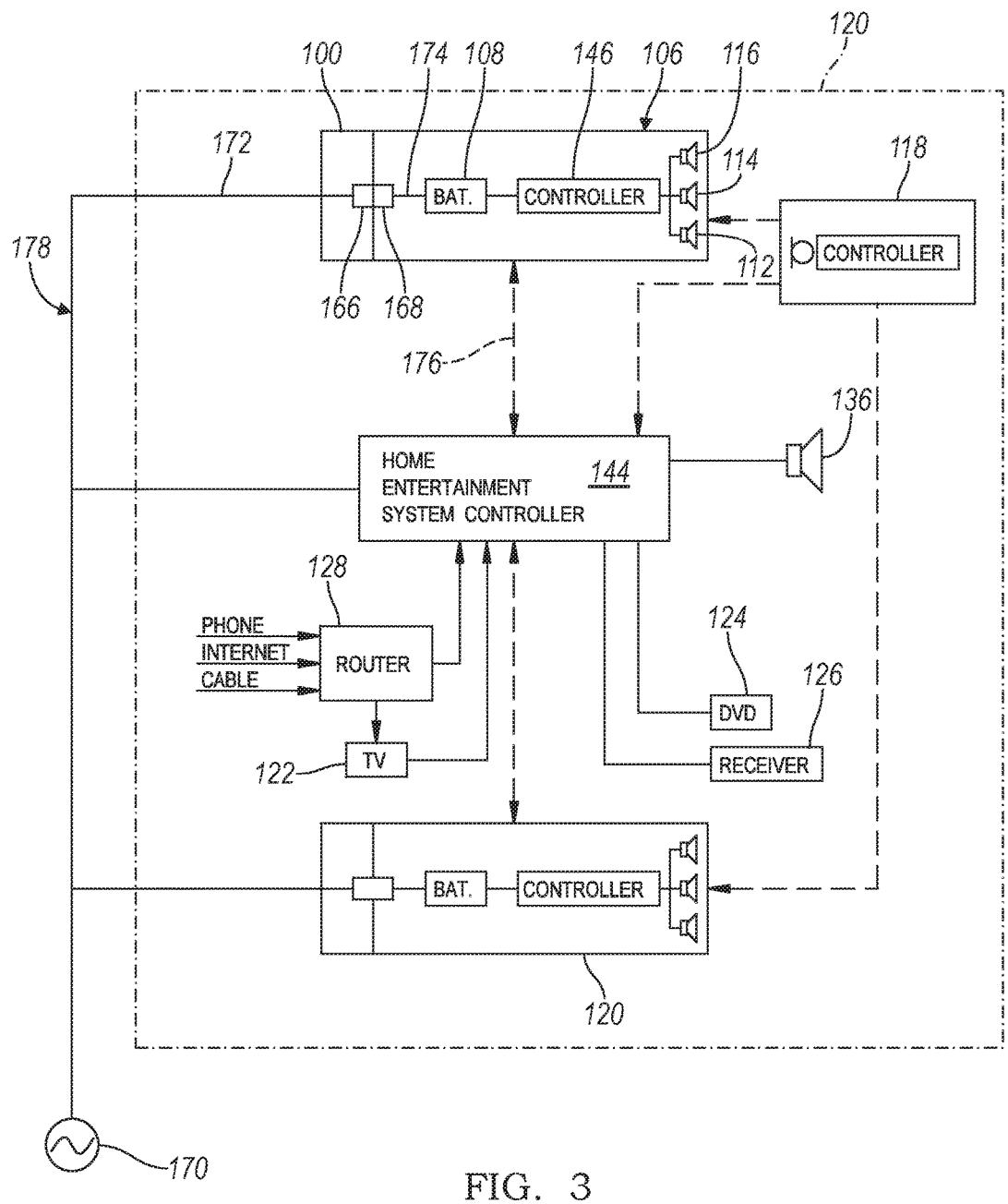
FIG. 3 is a system diagram of the home audio system of FIG. 1.

Referring to FIGS. 2-3, the charging station 100 includes an electrical connector 166 that mates with a corresponding speaker connector 168 of the speaker system 106. The electrical connector 166 is connected to the home AC power 170 by a cable 172; and the speaker connector 168 is connected to the speaker battery 108 by speaker wires 174 (shown in FIG. 3) to collectively form a charging circuit 178 for charging the speaker battery 108. The speaker connector 168 includes an AC to DC converter for converting the home AC power 170 to DC for charging the speaker battery 108. In other embodiments, the charging station 100 is connected to a DC power source (e.g., to the home controller 144), or through an internet connection, e.g., by power over Ethernet (POE) technology.

FIG. 3 is a system diagram illustrating electrical communication within the home entertainment system 120. The home entertainment system 120 includes the home controller 144 and the speaker system 106. The home entertainment system 120 also includes the television 122, the media player 124, the audio receiver 126, the router 128, the front-right speaker 130, the right-side speaker 132 (shown in FIG. 1), the rear-right speaker 134 (shown in FIG. 1), the rear-left speaker (not shown), the left-side speaker (not shown), and the subwoofer 136.

The home controller 144 and the speaker controller 146 each include one or more transceivers (not shown) for communicating with each other. In the illustrated embodiment, the controllers 144, 146 communicate wirelessly with each other using known technology, such as Bluetooth or WiFi, as depicted by dashed signal line 176. However, in other embodiments, the controllers 144, 146 are connected by audio wires (not shown) for providing wired communication. In other embodiments, the speaker system 106 includes transceivers for wired and wireless communication and the speaker controller 146 is connected to the transceivers by inputs and outputs.

The home controller 144 and the speaker system controller 146 each include one or more drivers, amplifiers and crossovers (not shown). The crossover separates the audio signal by frequency bands into a low-frequency component, a medium frequency component and a high frequency component and sends the audio signal components to the appropriate speakers. The home controller 144 also separates the audio signal into channels corresponding to the location of the speaker in the room to provide the surround sound effect. For example, the home controller 144 provides a low-frequency component of the audio signal to the subwoofer 136. However, since the loudspeaker system 106 includes its own controller 146; the home controller 144 provides the full range audio signal to the speaker controller 146, in one or more embodiments, which uses its own crossover to separate the audio signal by frequency and provide each frequency component to the appropriate transducer (i.e., the low-frequency component to the woofer 112, the mid-range frequency component to the mid-range transducer 114 and the high-frequency component to the tweeter 116.)

Additionally, since the speaker system 106 is oriented as the front-left speaker of the home entertainment system 120 (shown in FIG. 1), the home controller 144 provides the front-left channel of the audio signal to the speaker controller 146. In other embodiments, the home controller 144 provides all audio signal channels to the speaker system 106, and the speaker controller 146 selects the appropriate channel based on its location.

It is recognized that any controller, circuit or other electrical device disclosed herein may include any number of microprocessors, integrated circuits, memory devices (e.g., FLASH, RAM, ROM, EPROM, EEPROM, or other suitable variants thereof) and software which co-act with one another to perform any number of the operation(s) as disclosed herein. In addition, any one or more of the controllers may be configured to execute a computer-program that is embodied in a non-transitory computer readable medium that is programmed to perform any number of the functions as disclosed.

As shown in FIG. 1, the speaker system 106 may also be removed from the charging station 100 and function as a portable speaker system. When removed from the charging station 100, the speaker system 106 receives audio signals wirelessly, e.g., from the portable media device 118 or from the home controller 144. However, in some instances, the speaker system 106 may receive audio signals from multiple sources, e.g., from both the portable media device 118 and from the home controller 144. To avoid confusion in such a situation, the speaker controller 146 prioritizes the audio signals differently depending on whether or not the speaker system 106 is docked to the charging station 100. In one embodiment, the speaker system 106 includes a port for receiving audio signals by wired communication when the speaker system 106 is removed from the charging station 100.

Figure 4:
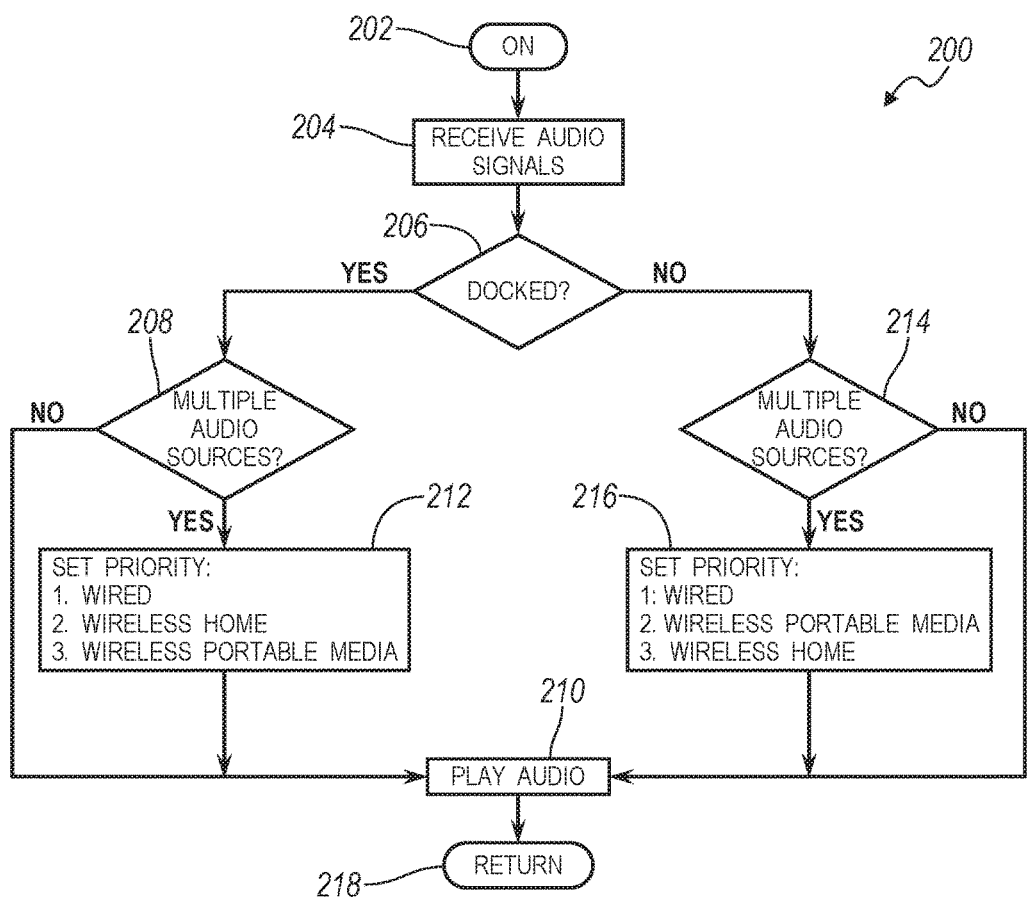
FIG. 4 is a flow chart illustrating a method for controlling the speaker system based on its location relative to the charging station, according to one or more embodiments.

Referring to FIG. 4, a method for controlling the speaker system 106 based on whether it is docked is illustrated according to one or more embodiments and generally represented by numeral 200. The method is implemented using software code contained within the speaker controller 146, according to one or more embodiments. In other embodiments the software code is shared between multiple controllers (e.g., the home controller 144 and the speaker controller 146).

At operation 202, the speaker controller 146 receives an "on" command. The on command is transmitted to the speaker controller 146 in response to a user pressing a button on the speaker system 106 itself, or by the user sending the command wirelessly, e.g., from the portable media device 118. Alternatively, the speaker controller 146 may turn on automatically in response to receiving electrical energy through the charging circuit 178 when mounted to the charging station 100.

At operation 204, the speaker controller 146 receives one or more audio signals. The audio signals may be transmitted by the home controller 144 of the home entertainment system 120 or by the portable media device 118.

At operation 206, the speaker controller 146 determines the location of the speaker system 106 relative to the charging station 100, e.g., whether or not the speaker system 106 is docked to the charging station 100. In one embodiment, the speaker controller 146 determines that the speaker system 106 is docked in response to receiving the home AC power 170 through the charging circuit 178. In other embodiments, the speaker controller 146 determines the location of the speaker system 106 relative to the charging station 100 using a known localization method. If the speaker controller 146 determines that the speaker system 106 is docked, it proceeds to operation 208.

At operation 208, the speaker controller 146 determines if it has received audio signals from multiple sources. If the determination at operation 208 is negative, the speaker controller 146 proceeds to operation 210 and provides the received audio signal component to the corresponding transducer 112, 114, 116, which in turn provides sound corresponding to the signal (i.e., it "plays" the audio). If the determination at operation 208 is positive, the speaker controller 146 proceeds to operation 212.

At operation 212, the speaker controller 146 sets, or assigns, the following priority to the audio signals: 1) a wired signal received from the home controller 144; 2) a wireless signal received from the home controller; and 3) a wireless signal received from another source, e.g., the portable media device 118. Since the speaker system 106 is docked, it is assumed that the user intends to use the speaker system 106 as part of the home entertainment system 120 and priority is given to signals received from the home controller 144. Additionally, signals received through wired communication are given priority over those received through wireless communication because it is easier to control transmission by wired communication—and therefore the signal is more likely to be transmitted to the correct speaker. After assigning priority, the speaker controller 146 proceeds to operation 210 and provides the received audio signal component to the corresponding transducer 112, 114, 116, which in turn provides sound corresponding to the signal having the highest priority. In other embodiments, the speaker controller 146 is configured to allow a user to adjust the priority settings, e.g., using an application on their portable media device 118. For example, such an application would allow the user to specify a hierarchical arrangement for multiple devices or a "first-in, first out" approach. Such flexibility may also solve a scenario where there are three or more signals or multiple signals having the same priority (e.g., wireless signals from multiple portable media devices 118). In one embodiment the speaker controller 146 determines the identity of each audio source (e.g., the home entertainment system or the portable media device) and the type of audio communication (e.g., wired or wireless) based on which receiver or input receives the audio signal. In other embodiments, the audio signals themselves include characteristics that identify the identity of their source and/or type of communication.

If the speaker controller 146 determines that the speaker system 106 is not docked at operation 206, then the speaker controller 146 proceeds to operation 214.

At operation 214, the speaker controller 146 determines if it has received audio signals from multiple sources. If the determination at operation 214 is negative, the speaker controller 146 proceeds to operation 210 and provides the received audio signal component to the corresponding transducer 112, 114, 116, which in turn provides sound corresponding to the signal (i.e., it "plays" the audio). If the determination at operation 214 is positive, the speaker controller 146 proceeds to operation 216.

At operation 216, the speaker controller 146 sets, or assigns, the following priority to the audio signals: 1) a wired signal received from a source other than the home controller 144, e.g., the portable media device 118; 2) a wireless signal received from a source other than the home controller 144, e.g., the portable media device 118; and 3) a wireless signal received from the home controller. Since the speaker system 106 is not docked, it is assumed that the user does not intend to use the speaker system 106 as part of the home entertainment system 120 and priority is given to signals received from an audio source other than the home controller 144. Additionally, signals received through wired communication are given priority over those received through wireless communication because it is easier to control transmission by wired communication—and therefore the signal is more likely to be transmitted to the correct speaker. After assigning priority, the speaker controller 146 proceeds to operation 210 and provides the received audio signal component to the corresponding transducer 112, 114, 116, which in turn provides sound corresponding to the signal having the highest priority. Then the speaker controller 146 proceeds to operation 218 and then returns to operation 204. In other embodiments, the speaker controller 146 is configured to allow a user to adjust the priority settings, e.g., using an application on their portable media device 118. For example, such an application would allow the user to specify a hierarchical arrangement for multiple devices or a "first-in, first out" approach. Such flexibility may also solve a scenario where there are three or more signals or multiple signals having the same priority (e.g., wireless signals from multiple portable media devices 118).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A speaker assembly comprising:
   a housing;
   at least one transducer supported by the housing; and
   a controller adapted to:
   receive a first audio signal from a first audio source and a second audio signal from a second audio source, and
   receive input indicative of a type of signal communication of the first audio signal and the second audio signal,
   wherein the controller is programmed to:
   prioritize the first audio signal and the second audio signal based on a location of the housing relative to a charging station,
   prioritize the first audio signal higher than the second audio signal in response to the first audio signal being received by wired communication, and the second audio signal being received by wireless communication, and
   provide the highest priority audio signal to the at least one transducer.

2. The speaker assembly of claim 1 wherein the controller is further adapted to receive input indicative of an identity of the first audio source and the second audio source, and wherein the controller is further programmed to:
   prioritize the first audio signal higher than the second audio signal in response to
   the housing being located proximate to the charging station,
   the first audio source being a home entertainment system, and
   the second audio source being a portable media device.

3. The speaker assembly of claim 1 wherein the controller is further adapted to receive input indicative of an identity of the first audio source and the second audio source, and wherein the controller is further programmed to:
   prioritize the second audio signal higher than the first audio signal in response to
   the housing being located remote from the charging station,
   the first audio source being a home entertainment system, and
   the second audio source being a portable media device.

4. The speaker assembly of claim 1 further comprising:
   a first receiver for receiving audio signals by wired communication; and
   a second receiver for receiving audio signals by wireless communication;
   wherein the controller is further programmed to prioritize the first audio signal higher than the second audio signal in response to the first audio signal being received by the first receiver and the second audio signal being received by the second receiver.

5. The speaker assembly of claim 1 wherein the controller is further programmed to determine the location of the housing relative to the charging station based on receipt of electrical energy from an external power supply.

6. The speaker assembly of claim 1 further comprising the charging station, wherein the charging station comprises:
   a base with a first surface for mounting to an upright surface and a second surface extending from the first surface for supporting the housing;
   an electrical connector supported by the base; and
   a wire extending from the electrical connector, through the first surface and adapted to extend through the upright surface for connecting to a power supply;
   wherein the electrical connector is adapted to connect to a speaker battery supported by the housing when the housing is supported by the charging station for charging the speaker battery.

7. The speaker assembly of claim 1 further comprising:
   a speaker battery supported by the housing; and
   a speaker connector externally mounted to the housing and in electrical communication with the speaker battery;
   wherein the speaker connector is adapted to connect to an external power supply for charging the speaker battery when the housing is mounted to the charging station.

8. A speaker system comprising:
   a housing;
   at least one transducer supported by the housing; and
   a controller configured to:
   receive a first audio signal from a first audio source and a second audio signal from a second audio source,
   determine a location of the housing relative to a charging station,
   prioritize the first audio signal and the second audio signal based on a location of the housing relative to the charging station,
   prioritize audio signals received by wired communication higher than audio signals received by wireless communication, and
   provide the highest priority audio signal to the at least one transducer.

9. The speaker system of claim 8 wherein the controller is further configured to:
   prioritize the first audio signal higher than the second audio signal in response to
   the housing being located proximate to the charging station,
   receipt of input indicating that the first audio source is a home entertainment system, and
   receipt of input indicating that the second audio source is a portable media device.

10. The speaker system of claim 8 wherein the controller is further configured to:
    prioritize the second audio signal higher than the first audio signal in response to
    the housing being located remote from the charging station,
    receipt of input indicating that the first audio source is a home entertainment system, and
    receipt of input indicating that the second audio source is a portable media device.

11. The speaker system of claim 10 wherein the controller is further configured to determine the location of the housing relative to the charging station based on receipt of electrical energy from an external power source.

12. The speaker system of claim 10 further comprising:
    a speaker battery supported by the housing; and a speaker connector externally mounted to the housing and in electrical communication with the speaker battery;

wherein the speaker connector is adapted to connect to an external power source for charging the speaker battery when the housing is mounted to the charging station.

13. The speaker system of claim 8 further comprising:

a first receiver for receiving audio signals by wired communication; and a second receiver for receiving audio signals by wireless communication;

wherein the controller is further configured to prioritize the first audio signal higher than the second audio signal in response to the first audio signal being received by the first receiver and the second audio signal being received by the second receiver.

14. A method for controlling a speaker system comprising:

receiving a first audio signal from a first audio source;

receiving a second audio signal from a second audio source;

prioritizing the first audio signal and the second audio signal based on a location of a speaker system relative to a charging station;

prioritizing the first audio signal higher than the second audio signal in response to receiving the first audio signal by wired communication, and receiving the second audio signal by wireless communication; and controlling at least one transducer of the speaker system to play sound corresponding to only the highest priority audio signal.

15. The method of claim 14 further comprising:

receiving input indicating the first audio source is a home entertainment system;

receiving input indicating the second audio source is a portable media device; and prioritizing the first audio signal higher than the second audio signal in response to the speaker system being located proximate to the charging station.

16. The method of claim 14 further comprising:

receiving input indicating the first audio source is a home entertainment system;

receiving input indicating the second audio source is a portable media device; and prioritizing the second audio signal higher than the first audio signal in response to the speaker system being located remote from the charging station.

17. The method of claim 14 further comprising:

receiving a third audio signal from the first audio source; and prioritizing the first audio signal higher than the third audio signal in response to receiving the first audio signal by wired communication, and receiving the third audio signal by wireless communication.

* * * * *